Reissued Sept. 4, 1934 Re. 19,303

UNITED STATES PATENT OFFICE 19,303

DEWAXING OF PETROLEUM OILS

Leo D. Jones, Philadelphia, Pa., assignor to The Sharples Specialty Company, Philadelphia, Pa., a corporation of Delaware No Drawing. Original No. 1,881,643, dated October 11, 1932, Serial No. 147,383, November 9, 1926. Application for reissue April 15, 1933, Serial No. 666,323

29 Claims. (Cl. 196—19)

This invention relates to a method of refining petroleum by removing wax, and certain impurities in some instances, from the petroleum in its crude state or from petroleum distillates or residues, or mixtures thereof, and thereby producing wax-free oil for any purpose, and particularly to a method of obtaining substantially wax-free oil and wax, as separate products from wax containing lubricating oil stocks.

In the production of lubricating oil it is desirable to remove from the lubricating oil stock enough of the wax, that was brought into or remains in such stock as a result of the production of such stock from wax-containing crude petroleum, to cause the final product to have a suitable cold test. The character of the wax in lubricating oil stock varies according to the process by which the stock was produced and varies according to the source of the crude petroleum from which the stock was produced. The wax in lubricating stock may substantially all be crystalline or it may substantially all be amorphous, or the wax may consist of both crystalline and amorphous waxes present in different proportions. The wax in heavier residues of steam distillation and in the heavier distillates of such distillation is amorphous and the wax in lighter distillates of steam distillation and in most distillates and in some residues obtained by fire distillation is crystalline. In intermediate distillates of both fire and steam distillation amorphous characteristics of the wax may predominate. If a distillate or residue contains wax having predominating amorphous characteristics that wax may be changed to crystalline wax by subjecting the oil to fire or cracking distillation but in such an operation a considerable quantity of more valuable oil is lost and gas oil of lower value is necessarily produced. Obviously similar conditions regarding the wax content exist in stocks obtained from petroleum and used for the production of oils for other purposes such as medicinal use and insulation and immersion of electrical apparatus; and it is well known that crude petroleum contains both crystalline and amorphous wax in proportions depending upon its source.

In older practice petroleum oil containing wax that is crystalline has been freed of that wax to a more or less desirable extent by chilling and filter pressing the petroleum oil, and certain oil stocks, such as cylinder stocks, that contain amorphous wax have been freed of that wax to a limited extent, producing oil having a cold test unacceptable in the light of present standards, by diluting the oil and then chilling the solution thereof and allowing the chilled solution to settle by gravity. In such gravity settling some wax of crystalline nature is sometimes added to assist the settling operation.

In later practice wax has been separated from lubricating oil stock by diluting the wax-containing oil and chilling the mixture and then separating the wax from the chilled mixture by centrifugal processes described in the patents of Philip T. Sharples No. 1,416,890, No. 1,416,891, No. 1,232,104 and No. 1,351,265. The processes of those Sharples patents are entirely operative and have gone into extensive commercial use but in cases where the wax in the lubricating oil stock is all crystalline in nature it cannot be separated from the lubricating oil stock by those processes. For example, those processes will not effect separation of wax from the heavy fractions produced by fire or cracking distillation of crude petroleum from Pennsylvania.

I have discovered that if a body of oil, such as crude petroleum or distillates or residues thereof or stocks derived from petroleum for the production of oils for special uses, contains wax that is so largely crystalline in nature that it cannot be separated from the oil to a desired degree by known centrifugal processes, oil having a suitable cold test, and therefore free of wax to a desirable degree can be produced by centrifugal processes from such crystalline-wax-containing oil, provided the condition of the mixture of petroleum oil and wax is so regulated that the wax, upon being precipitated by chilling, is in a state in which it may be removed from the oil by centrifugal separation, e. g., in a state in which the precipitated wax is of greater average specific gravity than crystalline wax and is sufficiently plastic or amorphous to pass around the dividing wall and through passages of the centrifugal bowl.

In the separation from the oil of wax in such a state apparatus embodying the principles of that shown in Sharples Patent No. 1,232,104 may be effectively used.

Moreover, I have discovered that if lubricating oil stock contains wax that is so largely crystalline in nature that it cannot be separated from the oil to a desired degree by known centrifugal processes, the addition of amorphous wax to the oil, either by adding substantially oil-free petrolatum or by adding oil containing amorphous wax, causes the resultant content of wax to be of such nature that when precipitated by chilling it may be removed from the oil to a satisfactory degree by centrifugal processes in order to produce oil having a suitable cold test.

If a body of petroleum oil containing wax that is crystalline to such a degree that it may not be separated from the oil by known centrifugal processes is brought to a condition wherein suitable chilling, as described in the above-mentioned Sharples patents and my Patent No. 1,558,619, precipitates the wax in such form that the oil may be freed of wax to a suitable degree by centrifugal processes, particularly when it is brought to such condition by addition of amorphous wax, the precipitated wax constitutes a solid solution of crystalline wax and amorphous wax and is of greater average specific gravity than crystalline wax and is sufficiently plastic or amorphous to pass around the dividing wall and through passages of the centrifugal bowl. In order that the precipitate shall comprise a solid solution of crystalline wax and amorphous wax the condition of the mixture of wax and oil must be regulated, as by the addition of amorphous wax, prior to the precipitating chilling.

If a mixture of wax and petroleum oil contains substances, other than hard asphalt, that are commonly removed from oil or from such mixtures by acid treatment or by clay treatment or by both treatments the centrifugal removal of wax, especially crystalline wax, and particularly the lighter of the crystalline waxes, is thereby assisted as set forth in my copending Patent No. 1,784,525 issued December 9, 1930. Furthermore, if a mixture of wax and petroleum oil contains such substances the separately discharged wax will contain a greater percentage of impurities than the separately discharged oil will contain, and some impurities that are otherwise difficult to remove from the oil, i. e., impurities that are most economically removed with acid or which, if removed by clay, use up the purifying qualities of considerable quantity of clay, pass out of the oil in the dewaxing operation. Another advantageous effect of the addition of amorphous wax to a mixture of wax and petroleum oil, either by adding substantially oil-free petrolatum or by adding oil containing amorphous wax, is that one may thereby bring into the lubricating stock from which wax is to be removed those substances, other than hard asphalt, that are removed by acid treatment or by clay treatment and which assist in obtaining satisfactory removal of wax centrifugally even though the wax is in part crystalline wax. If the mixture of petroleum oil and wax when prepared for dilution, chilling, and centrifuging does not contain such substances it is advantageous that such substances be added, as by the addition of any oil or oil and wax mixture containing them.

An important advantage of my invention is that by the practice thereof wax-containing petroleum oils may be centrifugally dewaxed to a suitable degree regardless of the extent or degree to which the wax is crystalline. Another important advantage, therefore, is that in the practice of my invention it is possible centrifugally to dewax to a suitable degree petroleum oils that contain wax that is in part crystalline but as a whole so amorphous in character that it cannot be removed by filter pressing without preliminary cracking distillation, and petroleum oils containing wax that is in part amorphous but is as a whole so crystalline in character that it cannot be removed by previously known centrifugal processes. In other words, petroleum oils that contain wax that is too amorphous in nature to be removed to a suitable degree by filter pressing without prior cracking distillation and petroleum oils that contain wax that is too crystalline in nature to be removed to a suitable degree by prior centrifugal processes, can be dewaxed to a suitable degree without loss in the practice of my invention by so controlling the condition of the mixture of petroleum oil and wax that the wax, upon precipitation by chilling, is in a state in which it may be removed by centrifugal processes.

The characteristics of petroleum oils or products that contain wax that is too amorphous in nature or character to be removed to a suitable degree by filter-pressing without preparatory cracking distillation and is too crystalline in nature or character to be removed to a suitable degree by prior centrifugal processes, will be further understood by a general consideration of the variations in the characteristics of wax in different petroleum oils or products. Substantially all of the wax in a petroleum product may precipitate in crystalline form as in the case of a cracked distillate, or a light wax-bearing fraction of petroleum, or most distillates and some residues obtained by fire distillation; or substantially all of the wax may precipitate in amorphous form as in the case of steam refined cylinder stock and other products above mentioned. Between these two classes which typify the limiting conditions with respect to wax content, lie petroleum products in which both amorphous wax and crystalline wax are precipitated together and in which the proportion of the total wax content that is crystalline varies from a large value to a relatively small value and the proportion of the wax content that is amorphous varies from a small value to a relatively large value, conspicuous examples of this class of petroleum products being wax distillate and long residuum of petroleum produced by distilling gas, naphtha, burning oil and gas oil from wax-bearing petroleum. If the wax precipitated is substantially all crystalline, it may be removed by filter-pressing but as the proportion of amorphous wax present with the crystalline wax increases, such dewaxing becomes more and more difficult until the amorphous proportion attains a substantial value and then filtering is impracticable because of the clogging of the filter. When the wax precipitated is substantially all amorphous, it can be removed by operations involving separation by difference of specific gravity, including centrifugal separation, but as the proportion of crystalline wax present with the amorphous wax increases, such separating methods become more and more ineffective and the degree to which wax is removed becomes less and less satisfactory because some crystalline wax may be of such low specific gravity that it does not separate from the oil together with the heavier wax by methods involving separation by difference of specific gravity and crystalline wax tends to clog centrifugal machines. Thus, the ratio of amorphous wax to crystalline wax in wax the precipitate may vary through a broad range and most of the petroleum products in which amorphous wax and crystalline wax precipitate together cannot be dewaxed to a satistory degree by filter pressing without loss-incurring preliminary cracking distillation, or by methods involving separation by differences of specific gravity and including prior centrifugal methods.

In accordance with this invention petroleum products consisting of a mixture of oil and wax, and particularly products which could not previously be dewaxed to a desirable degree by methods involving difference of specific gravity because of the presence of crystalline wax alone or in addition to amorphous wax, are rendered dewaxable to a satisfactory degree by available methods involving difference of specific gravity by so controlling the condition of the mixture of petroleum oil and wax that the wax, upon precipitation by chilling, is in a state in which it may be removed to a satisfactory degree by methods dependent upon difference of specific gravity, as by centrifugal separation, the centrifugal separation herein referred to being carried out in an imperforate bowl and the radial movement of wax particles through oil or oil solution under the action of centrifugal force to their proper zone of the bowl being termed subsidence in many instances in this art.

Such controlling of the condition of the mixture is for the purpose of bringing it to a condition in which wax precipitated in it, or in a solution of it in a solvent, is as a whole or in all of its parts of such specific gravity and of such plasticity or amorphousness that the wax may be removed to a desired degree by available methods and apparatus depending upon separation by difference of specific gravity, leaving the oil or a solution thereof that is wax-free to a desired degree. Such controlling of the condition of the mixture consists in a regulation of the amorphousness or specific gravity of the total wax present in the oil. Such regulation can be effected by causing the oil-wax mixture to contain a substance or substances tending to bring the wax to a condition in which, when precipitated it will be sufficiently amorphous and will have a specific gravity suitable or necessary to its separation from the oil by methods dependent upon difference of specific gravity, as by centrifuging. Such substances may be termed "amorphizing" substances, and they may be amorphous wax and other substances that exert desired influences on the wax present and which include impurities other than hard asphalt that naturally occur in petroleum oil and are commonly removed from petroleum oil by clay or acid-treatment. "Amorphizing" impurities of petroleum may be caused to be present in the oil-wax mixture in a concentration suitable or necessary to the removal of wax by continuous centrifugal separation, as a result of the preparation of the oil-wax mixture, as by omitting or limiting decolorizing treatment or by extending the distilling operation by which a distillate oil-wax mixture is produced, or by addition to the oil-wax mixture of oil or oil and wax containing such impurities as above stated. Such "amorphizing" substances as amorphous wax and "amorphizing" impurities of petroleum may either or both, separately or together, be added to the oil by mixing them with the oil or by mixing with the oil a substance containing the wax or the impurities sought to be added to the oil. Thus, in the practice of this invention one or more "amorphizing" substances is deliberately caused to be present in oil that would not otherwise be readily dewaxable by methods dependent upon difference of specific gravity, for the purpose of rendering the oil dewaxable by such methods, as contrasted with that ordinary preparation of oil for dewaxing which does not involve the premeditated bringing of such substances into the oil for that purpose; and while such forming of a mixture well suited to such dewaxing in accordance with this invention may be referred to as blending, the use of that term is not intended to imply that there is necessarily some chemical union between the ingredients of the final mixture, because desired "amorphizing" substances can be brought into the mixture in any convenient manner at any appropriate stage in the preparation of the oil for the removal of wax therefrom.

My copending application, Patent No. 1,784,525, issued December 9, 1930, is directed broadly to the ensuring of a proper concentration in the oil of such "amorphizing" impurities of petroleum and specifically to the addition to the wax-containing oil of such "amorphizing" impurities of petroleum, for the purpose of rendering dewaxable by methods dependent upon difference of specific gravity oil containing wax that is wholly or in troublesome proportion crystalline, and to the dewaxing of oil containing such impurities. This application is directed broadly to the regulating of the condition of crystalline-wax-containing oil to the end that wax precipitated therein may be removed therefrom by methods dependent upon difference of specific gravity, and especially by continuous centrifugal separation, and specifically to the ensuring of a proper concentration of "amorphizing" substances generally, and specifically to the addition for that purpose to the oil to be dewaxed of amorphous wax alone or amorphous wax together with impurities that naturally occur in petroleum and are commonly removed from petroleum oil by clay or extensive acid-treatment and are other than hard asphalt.

The wax-free oil discharged from the centrifuge is heated to remove the diluent and is subjected to such purifying and fractionating operations as may be necessary to produce the desired final products.

In petroleum oil prepared for dewaxing by centrifugal processes in accordance with my invention, by reducing the ratio of wax of crystalline nature present to wax of amorphous nature present, particularly when that ratio is reduced by addition of amorphous wax, the ratio of crystalline wax to amorphous wax will depend upon the desired nature of the wax discharged from the centrifuge, taking care, however, that the ratio is sufficiently low to ensure a removal of the wax that is sufficiently complete to produce oil possessing the desired cold test. Thus, if a hard wax is desired, amorphous wax of suitable quality will be added only to such an extent that the wax removed from the oil will possess or can be brought to the desired degree of hardness; but if such proportioning of amorphous wax and crystalline wax does not bring the mixture of oil and wax to such condition that the oil discharged from the centrifuge is sufficiently freed of wax to give the desired cold test then a greater proportion of amorphous wax will be added to the oil before the chilling and centrifugal dewaxing operation. Wax removed from the oil and discharged from the centrifuge is heated to remove the diluent that is added to the oil before the chilling and centrifugal dewaxing operation. For some purposes, however, the crystalline wax may be distilled off of the wax discharged from the centrifuge leaving a wax residue that is substantially free of crystalline wax and suitable for further use in increasing the amorphous wax content of oils containing crystalline wax. The crystalline wax so obtained may be sweated or, if necessary, cracked and sweated.

I have referred above to the amorphous or crystalline nature of the wax in petroleum oils occurring or produced in different stages or types of distillation but consideration must also be given to the original source of the crude oil as different crude oils produce different mixtures of wax and oil under the same treatment. In the practice of my invention it is also possible to gain economical advantages by securing products of lower cost but containing crystalline wax and then bringing the mixture to a condition in which the petroleum oil may be satisfactorily freed of wax. Oil prepared for dewaxing in accordance with my invention should not contain such impurities as hard asphalt but if oil and wax mixtures so prepared contain other substances above referred to the centrifugal dewaxing processes will be more effective in the removal of wax and desirable purification will be effected as above pointed out.

To assist in the understanding of my invention I now describe three specific advantageous applications thereof.

In common practice, in steam distillation of petroleum, naphtha and kerosene and gas oil are distilled off and then a fraction, commonly known as wax distillate, is distilled off, the residue being cylinder stock or asphalt, depending upon the nature of the crude petroleum. In fire distillation similar fractions are taken off and the wax in the wax distillate, which distillate is sometimes called "paraffin distillate" when produced by fire distillation, is more crystalline than the wax in wax distillate produced by steam, and the residue is coke. These wax distillates, known in practice as "slop", are a mixture of oil and wax, some of the wax being crystalline and some of the wax being amorphous. Considering wax distillates as a whole, so large a proportion of the wax content is crystalline in nature, unless distillation has been carried on with great care and with the use of large quantities of steam, that the wax distillates cannot be dewaxed by known centrifugal processes; and the wax of these distillates is so amorphous that it may not be removed by filter pressing unless the distillates are preliminarily subjected to cracking distillation with consequent loss of oil.

Examples of such distillates are:

A. That fraction obtained from a typical Pennsylvania crude petroleum by steam distillation which begins at 80 seconds universal Saybolt viscosity at 100° F. and ends when the residue has a gravity of 27° Baumé or has a fire test of 600° F.

B. That fraction obtained from a typical mid-continent crude petroleum by steam distillation which begins when the oil in the stream has a viscosity of 80 seconds universal Saybolt viscosity at 100° F. and extends to a point at which the residue is a 600° F. fire test cylinder stock.

Large quantities of such wax distillate, in which the wax content is too amorphous to be removed by filter pressing and too crystalline to be removed by centrifuging, are produced in the oil industry. Large quantities of petrolatum are also produced from all cylinder stock residues in the production of bright stock and by centrifugal dewaxing of long residuum of mid-continent oils.

In the practice of my invention petrolatum from these sources is added to wax distillate in such proportion that when the mixture is diluted and chilled the precipitated wax is in such condition that it may be removed centrifugally from the oil and care in the production of the wax distillate is eliminated and it is possible to dewax wax distillates without preliminary injurious treatment. While the proportions employed in preparing such a mixture must usually, because of variations due to the source and preparatory treatment of the constituents, be determined by experiment in accordance with the principles herein stated, I have found that if nine parts of wax distillate (B) above-mentioned from mid-continent crude petroleum are mixed with one part of petrolatum obtained by cold settling, to produce bright stock, of cylinder stock that has been acid treated to such an extent that it is green by reflected light and opaque in thick layers to transmitted light but has not been subjected to clay treatment, the resulting mixture may be satisfactorily dewaxed by precipitating the wax by chilling and then centrifugally separating the wax from the oil.

In petroleum refining, oils are frequently produced that contain wax that is definitely crystalline in nature, for example, the distillate of cracking distillation of petroleum, wax distillate that has been subsequently subjected to cracking distillation, and the lighter wax-containing fractions of petroleum which are sometimes kept separate. Oil containing such definitely crystalline and hard wax was formerly dewaxed by filter pressing.

In the practice of my invention amorphous wax of high melting point, for example, wax from high fire test cylinder stock obtained from Wyoming crude oil is added to such crystalline-wax containing oil in such proportion that when the oil is diluted and chilled the precipitated wax can be satisfactorily removed from the oil centrifugally. The wax so produced is a hard wax of high melting point and is capable of immediate commercial use. The addition of soft amorphous wax should cause the precipitated wax to be in such condition that it can be removed from the oil centrifugally but the final product would not be a hard wax. While the proportions employed in preparing such a mixture must usually, because of variations due to the source and preparatory treatment of the constituents, be determined by experiment in accordance with the principles herein stated, I have found that this operation can be carried out as follows: If the distillate produced by fire distillation of a typical mid-continent crude petroleum is collected from the time at which the viscosity of the distillate stream is 50 seconds Saybolt Universal viscosity at 100° F. and until the residues have been reduced to coke, and then burning oils and gas oils, which were produced by the cracking that occurred in the first distillation, are distilled from this distillate, the residue contains crystalline wax and is a suitable constituent for the desired mixture. To produce a second constituent of the desired mixture a typical Wyoming crude petroleum is distilled to remove lighter constituents and the residue is acid treated and neutralized for the purpose of removing asphaltic impurities, and this product consisting of a topped crude petroleum and having a green bloom is subjected to steam distillation until the residue has a fire test of 700° F., and then the residue is diluted with naphtha and chilled and dewaxed centrifugally, and the wax obtained constitutes a second constituent of the desired mixture. Fifteen parts of the wax constituent are combined with eighty-five parts of the first constituent to produce the desired mixture and then the mixture is dewaxed by first diluting it with 65° Baumé naphtha producing a final diluted mixture containing 60% of naphtha and 40% of the combined first and second constituents. The diluted mixture is heated to about 100° F. and then chilled slowly to about −10° F. and the precipitated wax separated centrifugally. The wax-free solution of oil from the centrifuge is steam distilled to remove the naphtha and to adjust the final oil to the required flash and viscosity tests. The final oil will contain some heavy 700° F. fire test cylinder stock which was contained in the wax, either by occlusion or solid solution, that was derived from the Wyoming cylinder stock. The final wax fraction is steam distilled to remove naphtha and it will contain wax of high melting point derived from the Wyoming cylinder stock and also hard crystalline wax derived from the mid-continent distillate and this final wax may be used without extensive further treatment wherever a hard wax of high melting point is required.

Centrifugal processes dewax cylinder stocks to a high degree and produce wax unusually free from oil but containing occluded oil that cannot be separated from the wax centrifugally. It is possible to remove occluded oil by treating the wax with naphtha and chilling and separating the mixture, the wax so free from oil having a higher melting point. Petrolatum obtained from cylinder stocks by cold settling contains relatively large quantities of oil.

In the practice of my invention petrolatum obtained from cylinder stocks and particularly that obtained by cold settling, and preferably petrolatum obtained from high fire test and high viscosity stocks, is mixed with light wax distillate, i. e., a light fraction of petroleum or of the wax distillate thereof, and the wax takes up the light oil leaving the heavy oil free to be separated. Then the mixture is chilled and centrifugally separated and a substantially wax-free oil of medium viscosity is produced. As in the preparation of other mixtures herein described the proportions employed in preparing this mixture must usually, because of variations due to the source and preparatory treatment of the constituents, be determined by experiment in accordance with the principles herein stated, but I have found, as an example of this operation, that the fraction obtained by steam distillation of mid-continent crude petroleum and lying between 80 seconds and 150 seconds universal Saybolt viscosity at 100° F. may be dewaxed in accordance with my invention if eighty-five parts of such distillate are mixed with fifteen parts of petrolatum obtained from mid-continent crude petroleum by first distilling off naphtha and burning oils and then treating with acid until the oil has lost its black color and is green by reflected light and then steam distilling until the residue has a fire test of 600° F. and then diluting the residue with naphtha and obtaining the petrolatum by cold settling.

From the foregoing it will be apparent that my invention applies to petroleum oils of all kinds and to products derived therefrom, and that the nature of the preliminary mixing whereby the character of the precipitated wax is controlled, is determined by the principles above stated and with the assistance of the specific examples given. In this connection, the dewaxing of crude petroleum oil is entirely practicable in accordance with my invention and it results in two centrifugally separated fractions that are subjected to steam distillation, the residue of one fraction being petrolatum and the residue of the other fraction being bright stock. And it will also be apparent that I have disclosed a process, and have stated the principles and have given specific examples thereof, whereby wax may be removed by centrifugal processes to a desired degree of completeness, and to produce sufficiently wax-free oil for any of the many uses to which petroleum oil is put, from oils in which the original or natural content of wax is of such nature that it could not be removed by previously known centrifugal processes or by filter pressing or by cold settling, it being understood that the regulation of the condition of the mixture of wax and oil is to be carried out in accordance with my invention at any time prior to the precipitation of the wax by chilling in the preparation for centrifugal separation in accordance with the above-mentioned patents of Philip T. Sharples. It will also be apparent that in addition to the fact that by the practice of this invention it is possible to dewax to a satisfactory degree petroleum products that are necessarily produced in usual distillery practice, but which could not previously be dewaxed without preliminary cracking distillation, e. g., wax distillate formed in producing cylinder stock, the use of my invention makes it possible to reduce greatly the amount of distillation that must be performed because the petroleum need not be divided or converted by distillation into products containing only amorphous wax or only crystalline wax. For example, removal of only naphtha, burning oil and gas oil from petroleum gives a residue, known as a long residuum, containing all of the lubricating oil of the petroleum and this may be dewaxed as described herein without further distillation although it contains both crystalline wax and amorphous wax and could not be dewaxed by filter-pressing or by prior methods involving difference of specific gravity. Thus, while the proportions employed in preparing a mixture for dewaxing must usually, because of variations due to the source and preparatory treatment of the constituents, be determined by experiment in accordance with the principles herein stated, a residue of Pennsylvania or mid-continent crude oil, having a flash test of 350° F. or lower, may be dewaxed in accordance with this invention by mixing one part of petrolatum obtained from clay treated cylinder stock with each ten to twenty parts of the residue and then diluting the mixture and chilling and centrifugally removing the precipitated wax, the de-waxing being aided if the residue contains its natural impurities other than hard asphalt. A reference in the claims to oils containing crystalline wax is intended to include both oils that do and oils that do not contain in addition some amorphous wax.

From the foregoing it will be apparent that difficulties in centrifugal removal of wax from oil increase as the precipitated wax is as a whole more and more crystalline in character. Steam-refined cylinder stocks substantially free of hard asphalt and having a flash point in excess of 525° F. and a fire test in the neighborhood of 600° to 700° F., such as clay-treated residues of Appalachian oils and acid- and clay-treated residues of certain mid-continent petroleum oils, are readily dewaxable by continuous centrifugal dewaxing, the pour test of the final product being proportional to the degree of chilling preparatory to centrifugal separation of the precipitated wax. As the residue is left longer and longer and the flash point thereof is lower and lower, the wax in the oil contains a greater and greater proportion of wax capable of precipitating in hard crystalline form. As the flash point of the residue decreases through a range from 525° F. down to 450° F. the difficulties encountered in centrifugal dewaxing which are due to crystalline wax do not ordinarily increase to such degree as to require special steps for the purpose of overcoming those difficulties, but as the flash point of the residue drops farther and farther below 450° F. the presence of crystalline wax tends more and more to cause cloggage of the centrifuge and to cause floating wax which passes out with the dewaxed oil and impairs the pour test thereof. As pointed out above the difficulties encountered in the dewaxing of long residues because of the presence of crystalline wax therein may be overcome by adding thereto either petrolatum alone or oil containing markedly amorphous wax such as cylinder stock residues having a fire test as high as 600° F. or 700° F. Those difficulties can also be overcome by the presence in the long residue of substances other than hard asphalt which are commonly removed by clay treatment. As pointed out above, distillates of various boiling ranges can be dewaxed centrifugally provided the wax precipitated by the chilling thereof is caused to be sufficiently plastic and of sufficient specific gravity by adding to the oil to be dewaxed such amorphizing agents as either petrolatum alone or oil in which the wax is as a whole markedly amorphous, or by causing the oil to be dewaxed to contain such amorphizing substances as substances other than hard asphalt which are of the nature of those commonly removed from oil by clay treatment or acid treatment. Distillates which contain sufficient crystalline wax to impair or prevent continuous centrifugal dewaxing thereof, and which are or can be produced in refinery practice, constitute fractions of various boiling ranges and flash points and comprise all or any part of the oil having a boiling point equal to or higher than the temperature at which boils the lowest boiling constituent with which wax passes over. Thus, there may occur as a distillate, either as a result of batch distillation or any type of continuous distillation, any of that part of the oil which distills over in batch distillation between the first occurrence of wax in the distillate stream and the substantially complete elimination of lubricating oil constituents from the residue, leaving a residue of asphalt. In the practice of this invention distillates which may be dewaxed centrifugally providing there is added thereto "amorphizing" substances herein identified, include distillates comprising the whole body of oil last mentioned, distillates comprising only a part of that body of oil such as distillates like those above mentioned which are produced without regard to the nature of the residue, and distillates produced in running to an asphalt residue and having flash tests varying from 550° F. down to 350° F. All distillates, regardless of the flash point thereof are more difficult to dewax centrifugally than residues of corresponding flash point, because of the more marked crystalline character of the wax therein. Specifically, a distillate having a flash test of 450° F. and produced by continuous distillation, and even a so-called distillate cylinder stock produced by continuous distillation and having a flash test as high as 525° F. may present difficutly in the centrifugal dewaxing thereof, inasmuch as all distillates present in the continuous centrifugal dewaxing thereof more difficulties due to crystalline wax than do residues; and such distillates having flash tests between 450° F. and 525° F. may be mixed in the proportion of 2 to 4 parts by volume with one part of a residue having corresponding flash point, and the resulting mixture is readily dewaxable by continuous centrifugal separation in accordance with this invention. This is due to the amorphizing influence of the markedly amorphous wax in the residue upon the wax in the distillate which tends to precipitate in crystalline form.

What I claim as new and desire to secure by Letters Patent of the United States is:

1. In the dewaxing of petroleum oils containing crystalline wax, the steps comprising by blending forming a mixture of oil with crystalline wax and amorphous wax present in such proportions that wax precipitated from the mixture by chilling is in a state in which it is removable from the oil by continuous centrifugal separation, precipitating the wax by chilling, and centrifugally separating the oil and wax.

2. In the dewaxing of petroleum oils containing light crystalline wax, the steps comprising by blending forming a mixture of oil with crystalline wax and amorphous wax present in such proportions that wax precipitated from a naphtha solution of the mixture by chilling is of greater specific gravity than the residual solution, precipitating the wax by chilling such a solution, and separating the oil and wax by difference of specific gravities.

3. In the dewaxing of petroleum oils containing crystalline wax, the steps comprising by blending forming a mixture of oil with crystalline wax and amorphous wax present in such proportions that wax precipitated from a naphtha solution of the mixture by chilling is of greater specific gravity than the residual solution and is sufficiently amorphous to be separated therefrom by continuous centrifugal separation, precipitating the wax by chilling, and centrifugally separating the oil and wax.

4. In the dewaxing of petroleum oils containing crystalline wax, the steps comprising by blending forming a mixture of the oil containing crystalline wax and an "amorphizing" substance causing wax precipitated from the mixture by chilling to possess sufficient plasticity and high enough specific gravity to be separable from the oil by continuous centrifugal separation, precipitating the wax by chilling, and centrifugally separating the oil and wax.

5. In the dewaxing of petroleum oils, the steps comprising mixing together crystalline-wax-containing wax distillate of crude petroleum and petrolatum obtained from cylinder stock, in such proportions that the wax precipitated in the mixture by chilling is capable of being removed from the mixture centrifugally, precipitating the wax in the mixture by chilling and then separating wax therefrom centrifugally.

6. In the dewaxing of petroleum oils containing crystalline wax, the steps comprising forming a mixture of oil and crystalline wax, added amorphous wax, and substances commonly removed from oil by extensive acid treatment or clay treatment, precipitating the wax by chilling, and centrifugally separating the wax and oil.

7. In the dewaxing of petroleum oils containing crystalline wax that impairs or prevents centrifugal dewaxing of the oil, the steps comprising so regulating the condition of the mixture of oil and wax by the addition of an "amorphizing" substance that the wax, upon precipitation by chilling after dilution, is in a state in which it is capable of being removed by centrifugal separating processes, precipitating wax from the oil by chilling, and centrifugally separating the wax and oil.

8. In the dewaxing of petroleum oils containing crystalline wax that impairs or prevents centrifugal dewaxing of the oil, the steps comprising adding to such oil a sufficient quantity of an "amorphizing" substance to cause all wax precipitated from the oil by chilling to be removable by continuous centrifugal separation, precipitating the wax by chilling, and centrifugally separating the wax and oil.

9. In the refining of wax-containing petroleum oil, the process comprising by blending producing a mixture of oil with crystalline wax and amorphous wax of such properties and in such proportions that the wax when precipitated by chilling of the mixture is in a state in which it may be removed from the oil by centrifugal separation and will then be a hard and substantially amorphous wax of high melting point, precipitating the wax by chilling, and centrifugally separating the wax and oil.

10. In the refining of wax-containing petroleum oil, the process which consists in mixing with crystalline-wax-containing oil, hard amorphous wax in such proportion that wax precipitated from the mixture by chilling is capable of being centrifugally separated from the oil and after separation possesses properties rendering it suitable for commercial use, precipitating the wax by chilling, and centrifugally separating the wax and oil.

11. In the refining of wax-containing petroleum oil, the process which comprises mixing with crystalline-wax-containing oil, oil-containing amorphous wax in such proportions that wax precipitated from the mixture by chilling is capable of being centrifugally separated from the oil and the oil possesses the desired properties, precipitating the wax by chilling, and centrifugally separating the wax and oil.

12. In the refining of wax containing petroleum oil, the process which consists in producing a mixture of crystalline-wax-containing light oil with amorphous wax containing occluded heavy oil, the mixture being in such proportions that the resulting oil will have desired properties and wax precipitated therefrom by chilling will be capable of centrifugal separation from the oil, precipitating the wax by chilling, and centrifugally separating the wax from oil.

13. In the refining of petroleum oil, the process comprising mixing wax distillate obtained from mid-continent crude petroleum by fire distillation and freed of lighter products of cracking with petrolatum obtained from a residue that has been neutralized and freed of asphaltic impurities and was derived from Wyoming crude petroleum, chilling the resulting mixture and thereby precipitating the wax, and centrifugally dewaxing the oil.

14. In the dewaxing of petroleum oils, the step for rendering dewaxable, by methods involving separation of wax from oil by difference of specific gravity, petroleum oils containing crystalline wax that impairs or prevents dewaxing thereof by such methods, which comprises adding to such oil prior to the separation of wax therefrom amorphous wax and impurities other than hard asphalt that are removable from petroleum oils by clay treatment.

15. In the dewaxing of petroleum oils, the step for rendering dewaxable, by methods involving separation of wax from oil by difference of specific gravity, petroleum oils containing crystalline wax that impairs or prevents dewaxing thereof by such method, which comprises adding amorphous wax to such oil prior to the separation of wax therefrom and while it contains impurities other than hard asphalt that are removable from petroleum oils by clay treatment.

16. In the dewaxing of petroleum oils, the step for rendering dewaxable, by methods involving separation of wax from oil by difference of specific gravity, petroleum oils containing crystalline wax that impairs or prevents dewaxing thereof by such methods, which comprises adding amorphous wax to such oil prior to the separation of wax therefrom.

17. In a method for producing dewaxed mineral oil which involves separation of precipitated wax from oil by difference of specific gravity, the steps comprising forming a mixture of a suitable solvent, a distillate containing crystalline wax in such proportion as to impair or prevent continuous centrifugal dewaxing thereof, and a petroleum oil containing wax which is as a whole markedly amorphous, said amorphous-wax-containing oil being present in such proportion that wax precipitated from the resulting mixture by chilling is capable of being separated therefrom by continuous centrifugal separation; chilling the resulting mixture; and separating precipitated wax therefrom by continuous centrifugal separation.

18. In a method for producing dewaxed mineral oil which involves separation of precipitated wax from oil by difference of specific gravity, the steps comprising forming a mixture of a suitable solvent, a distillate containing crystalline wax in such proportion as to impair or prevent continuous centrifugal dewaxing thereof, and a residue which is obtained from wax-containing petroleum and in which the wax as a whole precipitates in a chilled solution of the residue in a form suitable for removal by difference of specific gravity, said residue being present in such proportion that wax precipitated from the resulting mixture by chilling is capable of being separated from said mixture by continuous centrifugal separation; chilling the resulting mixture; and separating the precipitated wax therefrom by continuous centrifugal separation.

19. In the dewaxing of mineral oil, the steps comprising forming a mixture of a solvent, oil containing crystalline wax in such proportion as to impair or prevent continuous centrifugal dewaxing thereof, and added amorphous wax, said amorphous wax being present in such proportion that wax precipitated by reduction of temperature of the resulting mixture is sufficiently amorphous for continuous centrifugal separation from the solvent-oil solution; chilling the mixture and thereby precipitating wax therein; centrifugally separating wax from the chilled mixture; separating from the separated wax the constituents thereof which precipitate in more crystalline form from an oil-naphtha solution, and thereby producing a residual body of wax which precipitates in amorphous form from an oil-naphtha solution; and utilizing the residual wax in the formation of additional mixture to be dewaxed.

20. In the dewaxing of mineral oil, the steps comprising forming a mixture of a solvent, oil containing crystalline wax in such proportion as to impair or prevent continuous centrifugal dewaxing thereof, and added amorphous wax, said amorphous wax being present in such proportion that wax precipitated by reduction of temperature of the resulting mixture is sufficiently amorphous for continuous centrifugal separation from the solvent-oil solution; chilling the mixture and thereby precipitating wax therein; centrifugally separating wax from the chilled mixture; distilling from the separated wax the lower boiling constituents thereof including wax which precipitates in more crystalline form from an oil-naphtha solution, and thereby forming a residue of wax which precipitates in amorphous form from an oil-naphtha solution; and utilizing the residual wax in the formation of additional mixture to be dewaxed.

21. In the dewaxing of petroleum oils, the step for rendering dewaxable, by methods involving separation of wax from oil by difference of specific gravity, petroleum oils containing crystalline wax that impairs or prevents dewaxing thereof by such methods, which comprises adding an "amorphizing" substance to such oil prior to the separation of wax therefrom.

22. In the dewaxing of wax-containing petroleum oil, the process which comprises mixing with crystalline-wax-containing oil, amorphous wax containing impurities other than hard asphalt that are commonly removed by clay treatment or by acid treatment, said amorphous wax being added in such proportions that wax precipitated from the resulting mixture by chilling is capable of being separated from the oil by continuous centrifugal separation, precipitating the wax by chilling, and centrifugally separating wax and oil.

23. In the dewaxing of petroleum oils, the method of dewaxing petroleum oils containing crystalline wax that impairs or prevents centrifugal dewaxing thereof, which comprises adding amorphous wax to such oil prior to the removal therefrom of impurities other than hard asphalt that are commonly removed by extensive acid treatment or by clay treatment, said amorphous wax being added in such proportions that wax precipitated from the mixture is sufficiently amorphous to be separated therefrom by continuous centrifugal separation, precipitating the wax by chilling, and centrifugally separating the oil and wax.

24. The method of removing slop wax from hydrocarbon oils containing same which consists in diluting such oil with a relatively low boiling hydrocarbon oil, adding a small quantity of petrolatum thereto, chilling and separating the wax from the oil.

25. In the process of removing slop wax from hydrocarbon distillates containing such wax by diluting, chilling and separating by difference in specific gravity, the steps of adding a small quantity of petrolatum thereto before said chilling and separation.

26. In a method for dewaxing petroleum oils involving separation of precipitated wax from the oil by difference of specific gravity, the steps comprising forming a mixture comprising oil that contains wax which does not settle readily when precipitated, substances naturally occurring in petroleum other than hard asphalt and removable therefrom by clay treatment, added amorphous wax, and a suitable solvent, chilling the resulting mixture and thereby precipitating wax therein, and then separating precipitated wax from the oil by difference of specific gravity.

27. A method for dewaxing a wax-containing oil involving separation of wax from oil, which comprises adding to the oil a petroleum distillation fraction of low A. P. I. gravity containing such a substantial proportion of amorphous wax as to lend to the wax content of the wax containing oil the essential characteristics of amorphous wax to condition the wax-containing oil for removal of precipitated wax by continuous centrifugal separation, chilling the wax-containing oil, and thereafter removing wax from the oil.

28. A method for dewaxing a wax-containing oil involving separation of wax from oil, which comprises adding to the oil a petroleum residue containing such a substantial proportion of amorphous wax as to lend to the wax content of the wax containing oil the essential characteristics of amorphous wax to condition the wax-containing oil for removal of precipitated wax by continuous centrifugal separation, chilling the wax-containing oil, and thereafter removing wax from the oil.

29. A method for dewaxing a wax-containing oil involving separation of wax from oil, which comprises adding to the oil a petroleum fraction containing such a substantial proportion of amorphous wax as to lend to the wax content of the wax-containing oil the essential characteristics of amorphous wax to condition the wax-containing oil for removal of precipitated wax by continuous centrifugal separation, chilling the wax-containing oil, and thereafter removing wax from the oil.

LEO D. JONES.